(12) United States Patent
Temby et al.

(10) Patent No.: US 11,224,206 B2
(45) Date of Patent: Jan. 18, 2022

(54) AGRICULTURAL MONITORING SYSTEM USING IMAGE ANALYSIS

(71) Applicant: Keltronix, Inc., Seattle, WA (US)

(72) Inventors: Kelton Temby, Seattle, WA (US); Jonathan Simpson, Lake Forest, CA (US)

(73) Assignee: KELTRONIX, INC., Santa Barbara, CA (US)

( * ) Notice: Subject to any disclaimer, the term of this patent is extended or adjusted under 35 U.S.C. 154(b) by 0 days.

(21) Appl. No.: 16/927,847

(22) Filed: Jul. 13, 2020

(65) Prior Publication Data

US 2021/0000083 A1    Jan. 7, 2021

Related U.S. Application Data

(60) Continuation of application No. 16/005,680, filed on Jun. 12, 2018, now Pat. No. 10,709,115, which is a division of application No. 15/173,614, filed on Jun. 3, 2016, now Pat. No. 9,992,977.

(60) Provisional application No. 62/170,444, filed on Jun. 3, 2015.

(51) Int. Cl.
*A01K 47/06* (2006.01)
*G06K 9/00* (2006.01)
*G06K 9/48* (2006.01)

(52) U.S. Cl.
CPC .......... *A01K 47/06* (2013.01); *G06K 9/00778* (2013.01); *G06K 9/00771* (2013.01); *G06K 9/48* (2013.01)

(58) Field of Classification Search
CPC ........................... A01K 47/06; G06K 9/00778
See application file for complete search history.

(56) References Cited

U.S. PATENT DOCUMENTS

2015/0049919 A1\*  2/2015  Humal ................ G06T 7/0012
                                                          382/110

OTHER PUBLICATIONS

Wray et al, "Collective personalities in honeybee colonies are linked to colony fitness", 2011, Animal Behaviour 81 (2011) pp. 559-568 (10 pages) (Year: 2011).\*

\* cited by examiner

*Primary Examiner* — David F Dunphy
(74) *Attorney, Agent, or Firm* — Chris Lambrecht

(57) ABSTRACT

Aspects of this disclosure include a system for providing non-contact, computer-vision based monitoring of the health and pollination activity of a beehive. The system may include camera positioned proximate to a beehive. The camera may include an onboard processor that analyzes video of the beehive captured by the camera and calculates an activity value that estimates a number of bees moving about the beehive. The video calculated activity values may be uploaded to a server where they can be accessed via a user device. The user device may allow the user to display interactive plots of the activity values over a variety of time bases. The disclosed beehive monitoring system relies on relatively lost-cost hardware and requires neither modification to the hive nor special constraints on the placement of the camera.

3 Claims, 9 Drawing Sheets

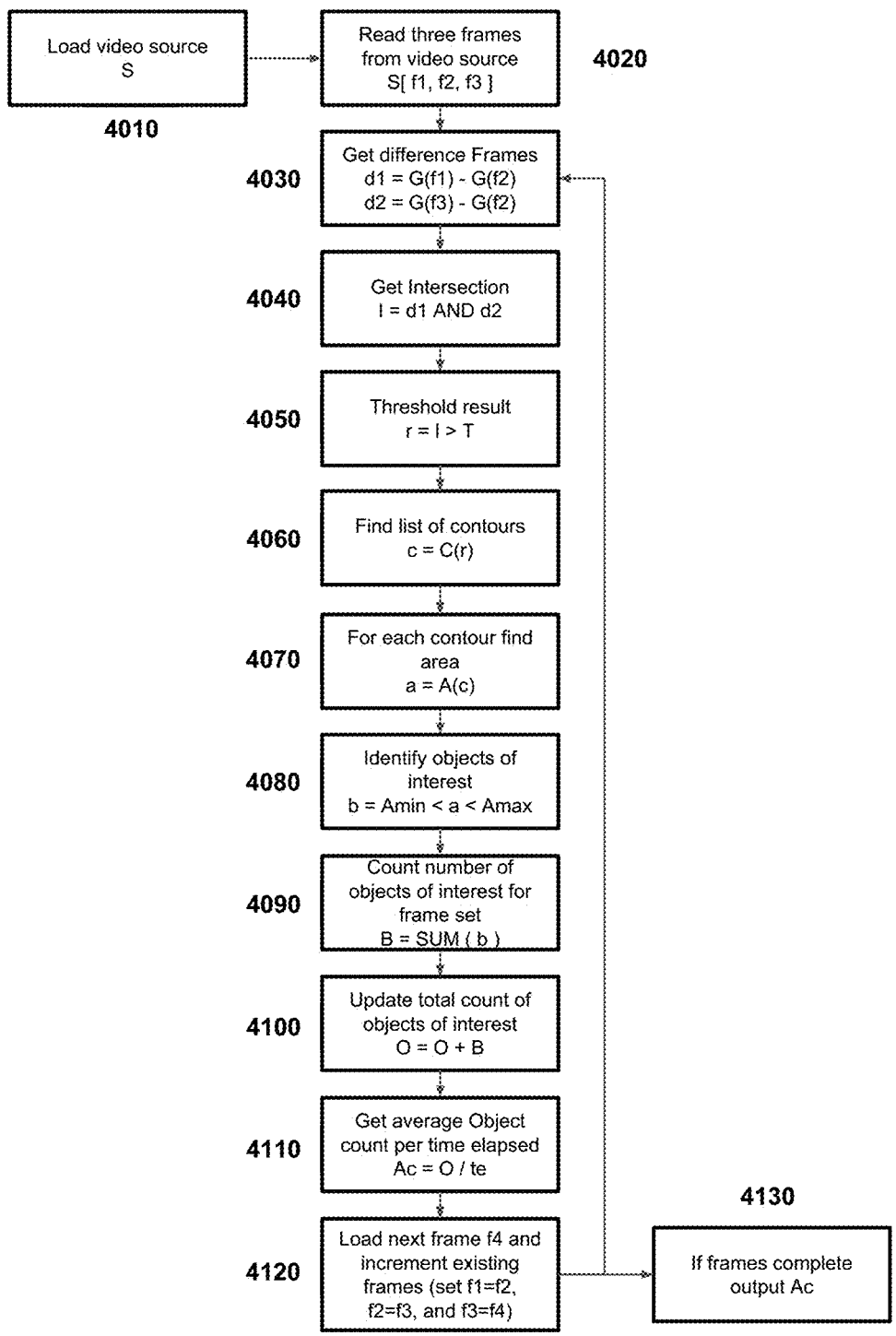

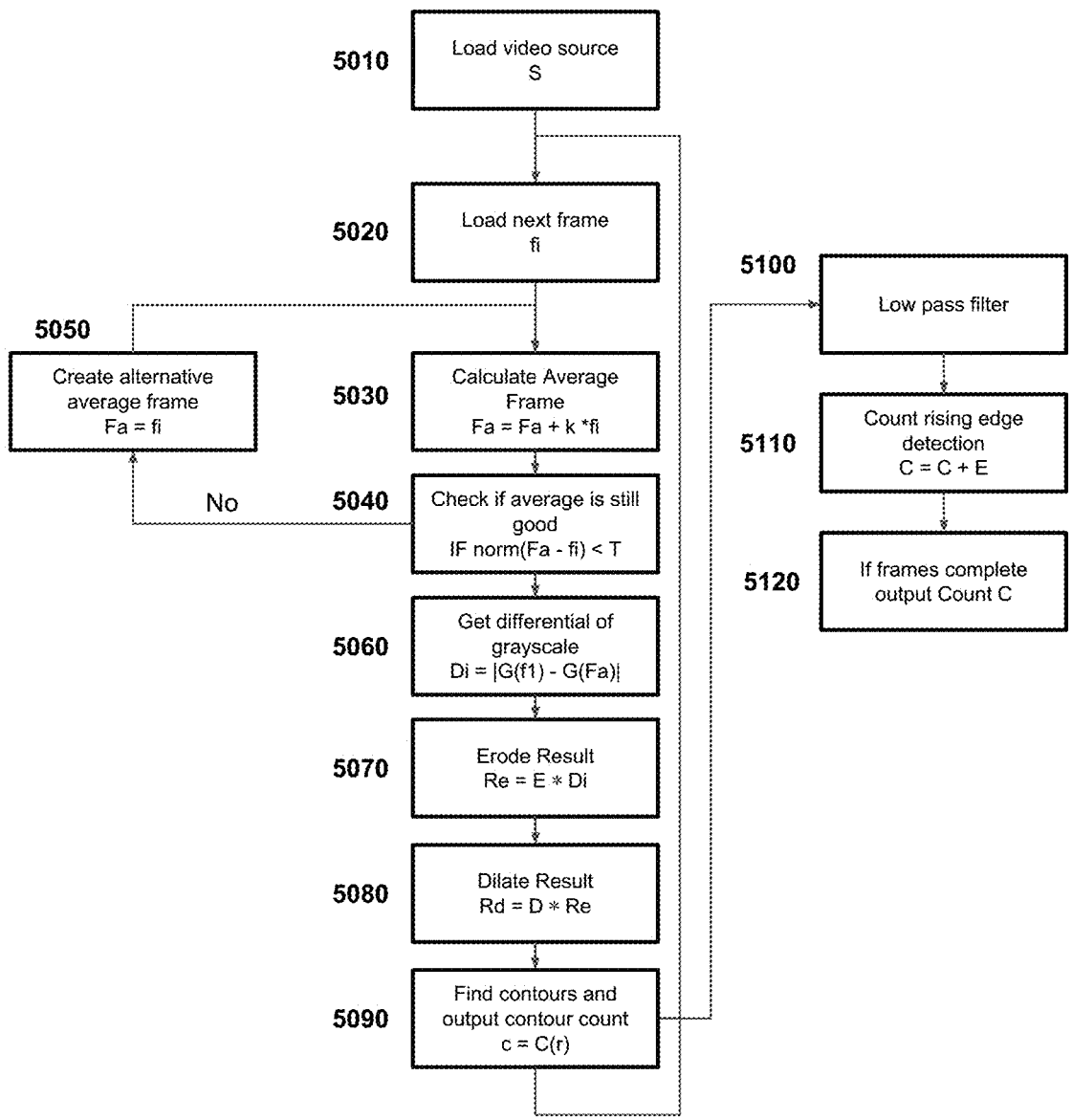

AGRICULTURAL MONITORING SYSTEM USING IMAGE ANALYSIS

CROSS-REFERENCE TO RELATED APPLICATIONS

This application is a continuation of U.S. application Ser. No. 16/005,680, filed Jun. 12, 2018, pending, which is a divisional of U.S. application Ser. No. 15/173,614, filed Jun. 3, 2016, now U.S. Pat. No. 9,992,977, which claims priority under 35 U.S.C. § 119(e) to U.S. Provisional Application No. 62/170,444, filed Jun. 3, 2015, the contents of which are hereby incorporated by reference in their entirety.

BACKGROUND

Bees play a critical role in sustaining Earth's ecosystems as well as human agricultural practices. In addition to providing honey, wax, and other useful products, bees provide a natural, eco-friendly mechanism for pollinating plants. The pollinating behavior of bees has been embraced by commercial and hobby farmers and around the world as a sustainable way to pollinate their crops. Today, nearly one-third of crops grown around the world are pollinated by bees. In practice, farmers typically maintain one or more bee colonies in beehives placed in proximity to their crops. Bee colonies are complex systems that can be affected by a number of factors including pests, pathogens, pesticides, predators, poor nutrition, climate, disease, and even theft. In order to ensure their bee colonies thrive, it may be beneficial for the beekeeper and crop grower to monitor the health and pollination effectiveness of his or her beehives.

SUMMARY

Previous beehive monitoring systems have included infrared gates mounted to the opening of the beehive. The infrared gates include a number of tunnels having a diameter large enough for individual bees to pass through. To enter or exit the hive, the bees must pass through these tunnels. The tunnels are flanked by infrared emitters and detectors. When the bees pass through the tunnels, the infrared beams are interrupted and these interruptions are tallied over time as a measure of hive activity. Similar systems have used capacitance-based sensors in place of infrared detectors. Drawbacks of these systems include the fact that the hive must be modified to include the tunnels themselves and that the tunnels must be cleaned regularly and/or may obstruct bee movement.

Cameras and computer vision techniques have also been employed in attempts to provide non-contact beehive monitoring. The approach in these systems is to capture video of the opening of the hive and use image analysis on the captured video to count the number of bees around the opening of the hive. This approach typically involves classifying objects in each frame as bees using shape detection algorithms and then tracking the movement of the classified objects among several frames using Kalman filters or other motion approximation and prediction algorithms. A drawback of this approach is that the classification and motion approximation algorithms are computationally expensive and require hardware that is both more expensive and less energy efficient. As a result, these systems are costly to scale and have not achieved commercial adoption. Additionally, these approaches may not work well where the background of the video is complex or dynamic. In some systems, the camera must be fixed to the hive and/or the hive must be modified to include a plain, light-colored surface to serve as the background of the camera's field of view. Finally, these approaches do little more than simply count the number of bees entering or leaving the hive. This counting approach does not necessarily provide any insight into the flight patterns of the bees, which may be a strong indicator of the health of the queen and the colony.

An object of this disclosure is to provide a beehive monitoring system that overcomes the drawbacks of the prior art by providing non-contact monitoring of bee activity using in-field video analytics and without requiring modification to the hive or special constraints on the placement of the camera. Another object of this disclosure is to provide a computationally inexpensive motion tracking algorithm that measures the activity levels of bees around a hive, rather than simply a raw count of bees entering or leaving a hive.

Embodiments of the disclosure may include video-based, real time monitoring and environmental sensing which is non-contact and may be portable or embodied in mobile, autonomous and remotely controllable hardware. The system supports on board as well as internet server (cloud) based data analysis and alerting based on data. The system leverages low computational cost tunable motion detection and quantification algorithms which scale to identifying simultaneously a large number of objects of interest. The system may use background subtraction and blob analysis to identify activity patterns from video sources of individual objects and groups of objects of interest. Objects of interest may include activity of bees around beehives, and other human perception tasks of measuring activity of people, plants, animals, traffic, machines, or architectural structures.

The system may employ a sensing algorithm that scales to detect many individually moving objects, while maintaining low computational complexity. The sensing algorithm can further identify patterns of interest in the video frames, e.g., pollen brought into a beehive.

The system may aggregate data and allow for trending across many individual video sources to identify global activity trends and behaviors, and automatically identify or measure activities of interest.

The system optionally enables data capture, storage, and uploading of video, processed video, temperature, humidity, pressure, audio and other environmental data, so individual users as well as computer algorithms or other services accessing data in a hosted data warehouse can view and analyze data.

Video, audio, and other sensed data may be captured from devices in a home, backyard, street, commercial building or remote agricultural location. Video and audio can be processed on board to create useful, lower bandwidth information which can be presented to a user on a mobile device, app, web app, or webpage, over a timescale from instantaneous to trends over several hours, days, weeks or years. Live video and audio can be transmitted for remote viewing and feedback for control of the system or to make a decision whether action is needed. Video and data can be processed on a server to log activity of an individual object of interest, or group of objects of interest, for example, to identify and highlight activity trends for a bee hive or plant growth, both healthy and unhealthy. Specific temporally significant events such as the detection of bee robbing or swarming behavior, or bear attack on a hive can trigger specific alerts.

Other applications include automatically alerting security personnel to the detection of unusual motion, even in areas with 'normal activity' (e.g. a bank robbery, detected due to a person or persons in a bank running, i.e., moving with an abnormal velocity profile exceeding a globally trended average velocity threshold).

One aspect of the disclosure is an apparatus for monitoring a beehive. The apparatus may comprise a camera that captures a sequence of video frames of the exterior of the beehive at a predetermined frame rate. The sequence of video frames includes at least a first video frame, a second video frame, and a third video frame. The apparatus also comprises a processor in communication with the camera system. The processor performs image analysis on the sequence of video frames to calculate an activity value that represents an estimate of the number of bees flying around the beehive. The image analysis performed by the processor includes the steps of: generating a first difference frame by subtracting the second video frame from the first video frame; generating a second difference frame by subtracting the third video frame from the second video frame; generating a differential image frame by combining the first difference frame and the second difference frame using a logical AND operation; generating a modified differential image frame by performing a thresholding operation on the differential image frame; identifying a set of contours in the modified differential image frame by performing blob detection on the modified differential image frame; generating a count of the number of contours in the set of contours having an area that falls within a predefined range; calculating the activity value by multiplying the count by the predetermined frame rate; and, storing the activity value on a storage device for retrieval by a user device.

Another aspect of this disclosure is an apparatus for monitoring a beehive. The apparatus comprises a camera that captures a sequence of video frames of the exterior of a beehive. The apparatus also comprises a processor in communication with the camera system. The processor performs image analysis on the sequence of video frames to calculate an activity value that represents an estimate of the number of bees in the vicinity of the beehive. The image analysis performed by the processor includes the following steps: generating a series of contour count values representing a number of contours identified in each frame; generating a filtered series of contour count values by applying a low-pass filter to the series of contour count values; incrementing the activity value for each increase in the filtered series of contour values; and, storing the activity value on a storage device for display on a user device. Generating the series of contour count values may include the following steps: generating an average frame by combining a current frame and at least one previous frame; generating a differential frame by subtracting the average frame from the current frame; generating a first modified differential frame by performing an erosion operation on the differential frame; generating a second modified differential frame by performing a dilation operation on the first modified differential frame; identifying a set of contours in the second modified differential frame; and, generating a count of the number of contours in the set of contours.

Yet another aspect of the disclosure includes a system for monitoring the health of a beehive. The system comprises a camera that captures a sequence of video frames of the exterior of the beehive. The system also includes a processor in communication with the camera. The processor analyzes the sequence of video frames to calculate one or more activity values that represents an estimate of the number of bees in the vicinity of the beehive in the sequence of video frames. The system further includes a server in communication with the processor. The server stores the sequence of video frames in association with the one or more activity values. Additionally, the system includes a user device in communication with the server. The user device displays a plot of activity values over time.

BRIEF DESCRIPTION OF THE DRAWINGS

FIG. 4 is a flowchart illustrating an exemplary image analysis technique that can be used to estimate a number of bees flying around a beehive.

FIG. 5 is a flowchart illustrating a second exemplary image analysis technique that can be used to estimate a number of bees moving about a beehive or other scene where bees may be present.

DETAILED DESCRIPTION

Aspects of this disclosure include a system, apparatus, method, and computer-readable storage medium for providing non-contact, in-field computer-vision based monitoring of the health and pollination activity of a beehive. The system may include a camera positioned proximate to a beehive. The camera may include an onboard processor that analyzes video of the beehive captured by the camera and calculates an activity value that estimates a number of bees moving about the beehive. The video and the calculated activity values may be uploaded to a server where they can be accessed via a user device. The user device may allow the user to display interactive plots of the activity values over a variety of time bases. This allows the user to monitor the health of the hive by way of a visual summary of bee activity around the hive. The user device may also allow the user to retrieve and playback stored video sequences. This enables the user to conduct a visual inspection of the hive at a desired time index from a remote location. The disclosed beehive monitoring system relies on relatively low-cost hardware and requires neither modification to the hive nor special constraints on the placement of the camera. The system may also be configured to recognize patterns in the activity values of one or more hives and classify the health of the hives accordingly. The system may be further be configured to provide notifications to the user device regarding the health and/or status of the hives.

Figure 1:
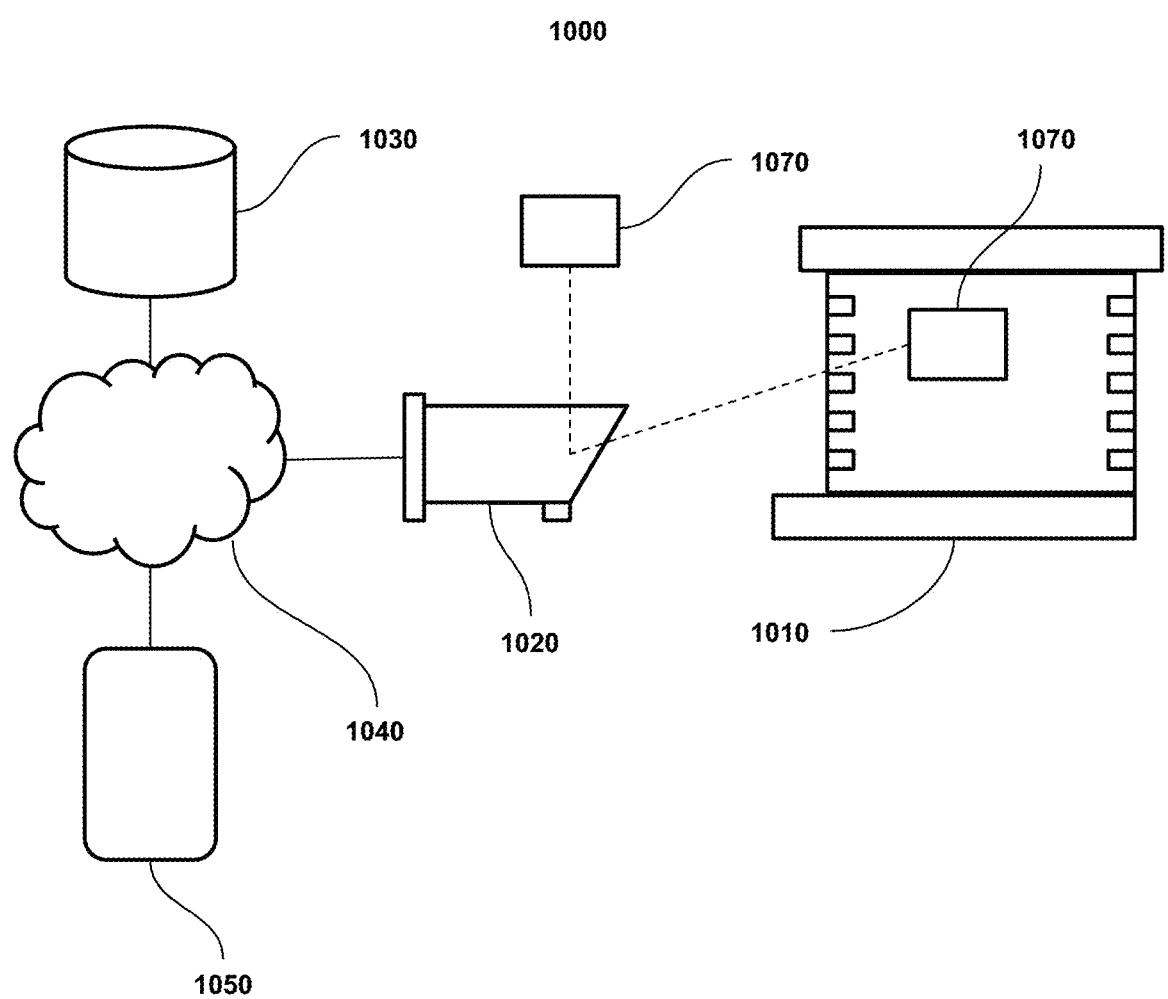
FIG. 1 is an overview of an exemplary beehive monitoring system.

Referring to the drawings more particularly by reference numbers, FIG. 1 shows an example embodiment of a system 1000 for monitoring a beehive 1010. The system 1000 may include a camera 1020 positioned in proximity of the hive 1010. The camera may be positioned so that the hive 1010 is within the field of view of the camera 1020. The camera may be coupled to or separate from the hive 1010. Ideally, the camera is positioned so that an opening of the hive 1010 is within the field of view of the camera.

The camera 1020 may be coupled to a server 1030 via a network 1040, such as the Internet. The camera 1020 may be coupled to the network 1040 via a wired or wireless network connection. The camera 1020 may capture video of the hive 1010. The camera 1010 may include an onboard processor (not shown) that analyzes one or more frames of the video of the hive and generates one or more activity values. Each of the activity values may represent an estimate of the number of bees flying or otherwise moving about the hive at a given time. The camera 1010 may transmit either or both of the activity value and the captured video to the server 1030.

The server 1030 may store the received activity values and/or video. A user device 1050 coupled to the network 1040 may access the server. The user device include a laptop computer, desktop computer, cell phone, smartphone, tablet, PDA, or other suitable device. The user device 1050 may retrieve the activity values and/or video stored on the server 1030. The server 1030 may also relay activity values and/or video to the user device 1050 in real time as they are received from the camera 1020. The user device 1050 may display or otherwise present the activity values and/or video provided by the server 1030.

The system 1000 may also include one or more external environmental sensors 1060 located within the vicinity of the hive 1010 and one or more internal environmental sensors 1070 located within the hive 1010. The internal and external environmental sensors 1060, 1070 may be in communication with the camera 1020 via a wired or wireless network connection. The environmental sensors 1060, 1070 may be configured to capture a variety of environmental variables including temperature, barometric pressure, humidity, light, wind speed, wind direction, rainfall or precipitation, and/or audio or sound. The camera 1020 may relay data captured by the environmental sensors 1060, 1070 to the server 1030 via the network 1040. Alternatively, the server 1030 may receive data captured by the environmental sensors 1060, 1070 via a separate network and/or network connection (not shown) that does not include the camera 1020.

In one embodiment, the camera 1020 may be coupled to a remotely-controlled mobile platform. The mobile platform may allow a user of the user device to move the platform among multiple hives. The mobile platform may also employ autonomous navigation and automated scheduling. This enables the user to configure the system to monitor a first hive for a period of time and then move to second hive and monitor the second hive for a period of time. The system may be configured to approach and monitor any number of hives for any period of time.

Figure 2:
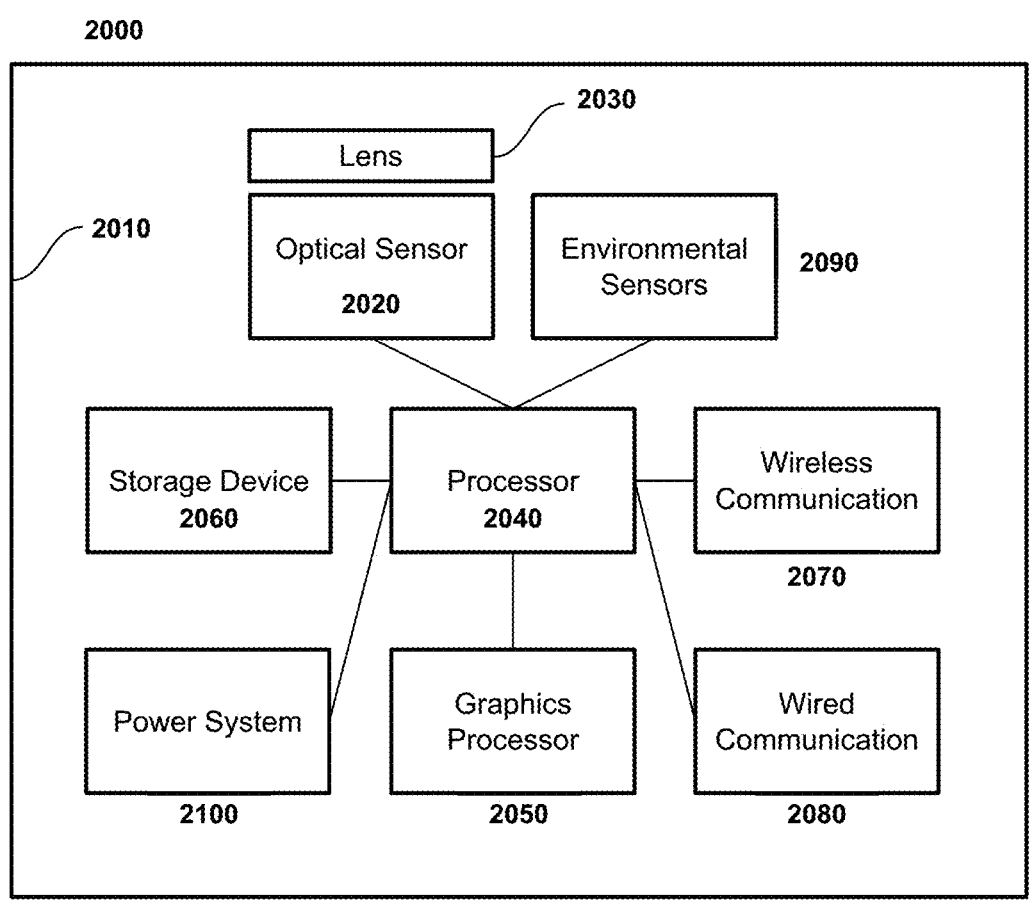
FIG. 2 is a block diagram illustrating exemplary components of a camera of a beehive monitoring system.

FIG. 2 illustrates an example block diagram of the functional components of a camera 2000 in accordance with the disclosure. The camera 2000 may include a variety of components mounted to an enclosure 2010. The enclosure 2010 may be sealed or otherwise weather-proofed. The camera 2000 may include a number of components mounted within the enclosure 2010. The camera may include an optical sensor 2020 mounted behind a lens 2030. The optical sensor 2020 may be coupled to a processor 2040. The processor 2040 may be coupled to a graphics processor 2050, a storage device 2060, a wireless communication system 2070, a wired communication system 2080, and/or one or more environmental sensors 2090. The various components of the camera 2000 may be powered by a power system 2100.

The optical sensor 2020 may operate to capture video of a beehive and communicate the video the processor 2040. The processor 2040 may perform image analysis on the video to calculate an activity value within the video. The processor 2040 may perform the image analysis in real time as video is received from the optical sensor 2020. Alternatively, the processor 2040 may store the video received from the optical sensor 2020 in the storage device 2060 and subsequently load the stored video from the storage device 2060 to perform the image analysis. The processor 2040 may also operate in conjunction with the graphics processor 2050 in performing the image analysis, or the image analysis may be performed solely by the graphics processor 2050. The processor 2050 may then store the processed or unprocessed video, or both, in the storage device 2060 in association with the calculated activity values. Alternatively, the processor 2040 may discard the video after processing and store only the calculated activity values in the storage device 2060.

The processor 2040 may communicate one or more calculated activity values processed and/or unprocessed video to either or both of the wireless communication system 2070 and the wired communication system 2080. Either or both of the wired/wireless communication systems 2070, 2080 may communicate the video and/or the calculated activity values to a remote server (not shown) for storage. The wireless communication system 2070 may include any number of network adaptors, including those suitable for cellular networks, WI-FI networks, infrared or other optical networks, and/or BLUETOOTH. The wired communication system may include any number of network adaptors suitable for wired communication, including Ethernet networks, USB (IEEE-1394) networks, cable (DOCSIS) networks, telephone (POTS) networks, and/or DSL networks.

The processor 2040 may additionally be in communication with one or more environmental sensors 2090. The environmental sensors 2090 may include a wide variety of sensors configured to capture one or more environmental variables including temperature, barometric pressure, humidity, light, wind speed, wind direction, rainfall or precipitation, and/or audio or sound. The processor 2040 may store data captured by the environmental sensors 2090 in the storage device 2060. The data from the environmental sensors 2090 may be indexed by time and stored in association with video captured by the optical sensor 2020 and/or activity values calculated by the processor 2040. The camera 2000 may also include a GPS location unit (not shown) that can be used to provide geolocation data.

Figure 3A:
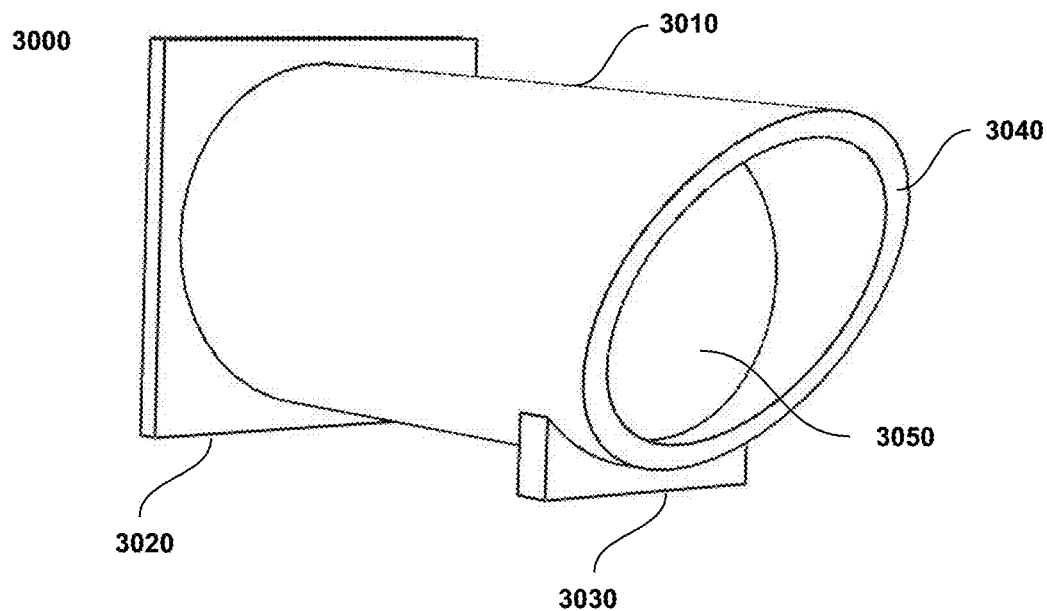
FIG. 3A is an exterior view of an exemplary camera of a beehive monitoring system.
Figure 3B:
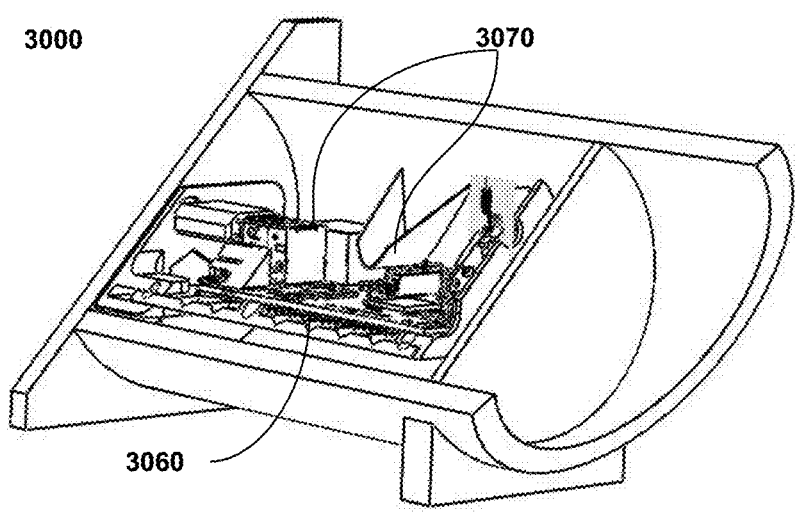
FIG. 3B is a cutaway view of an exemplary enclosure of a camera of a beehive monitoring system

FIG. 3A illustrates an external view of an example embodiment of a camera 3000 in accordance with the disclosure. The camera 3000 may include an enclosure 3010, a back plate 3020, and a stand 3030 to provide a level resting position. The housing 3010, back plate 3020, and stand 3030 may include a number of mounting provisions for mounting the camera 3000 to the ground, a beehive, or any suitable surface or structure. The mounting provisions may include brackets, pins, straps, clamps, adhesive, or any other suitable mechanism for securing the camera 3000 to a surface or structure. The enclosure 3010 may include an aperture 3040 that encloses a lens 3050. The aperture 3040 may be tapered to reduce glare from sunlight or other light sources on the lens 3050. FIG. 3B is a cutaway view showing the interior of an example embodiment of a camera 3000. The interior of the enclosure 3010 may include one or more circuit boards 3060 that host a variety of components 3070 of the camera 3000.

FIG. 4 is a flowchart illustrating a first exemplary image analysis algorithm 4000 that may be performed by the processor and/or graphics processor of a beehive monitoring system in accordance with the disclosure. The algorithm 4000 may be suitable for generating an activity value that estimates the number of bees flying around the opening of a beehive while excluding stationary or slow-moving bees. In this way, the algorithm 4000 is ideal for quantifying bee flight activity surrounding the hive. The algorithm 4000 may be particular well suited for calculating an activity count for a honeybee hive, where there are typically a larger number of bees and/or bees moving at a higher speed—as when flying. At step 4010, the processor loads a video source. The video source may be loaded from a storage device or received directly from an image sensor in real time. At step 4020, the processor reads a sequence of three video frames from the video source. At step 4030, the processor generates a first difference frame by subtracting the second video frame from the first video frame. The processor also generates a second difference frame by subtracting the third frame from the second frame. During step 4030, the processor may perform a grayscale operation on each of the first, second, and third frames to reduce the amount information required to represent the frames and, thus, accelerate the image processing. At step 4040, the processor generates a differential image frame by performing a logical AND operation on the first and second difference frames. The differential image frame represents the intersection of the first and second difference frames and may contain regions of differential movement where objects have moved between the first, second, and/or third frames.

At step 4050, the processor may perform a thresholding operating on the differential image frame in order to increase the contrast of the differential image frame. At step 4060, the processor performs blob detection on the differential image frame to identify a set of contours that represent regions of differential movement in the differential image frame. At step 4070, the processor may calculate the area of each of the contours in the set of identified contours. At step 4080, the processor identifies objects of interest, i.e., contours in the set of contours having a calculated area that falls within predefined minimum and maximum areas. The predefined maximum and minimum areas may be tuned to include the size of, for example, a bee, taking into account the distance between the camera and the field of interest, such as the opening of the beehive. By only counting those contours that fall within the predefined minimum and maximum areas, the processor can disregard regions of differential movement that are not likely to represent that of a bee within the field of interest. The processor may also use color thresholding to discard objects whose size may be similar to that of a bee, but whose color properties are not.

At step 4090, the processor generates a count of the number of objects of interest identified in step 4080. At step 4100, the processor updates a running total of the number of objects of interest by adding the count generated in step 4090 to the running total. At step 4110, the processor generates an activity value by averaging the running total of the number of objects of interest generated in step 4100 by the total time elapsed from the beginning of the video source to the last frame processed. This activity value represents the average number of objects moving in the video per unit time. At step 4120, the processor loads the a next frame from the video source. The processor the increments the existing frames by setting the current first frame to the current second frame, the current second frame to the current third frame, and the current third frame to the next frame loaded from the video source. The processor then returns to step 4030 and the process repeats.

The processor may iterate through the algorithm 4000 until the entire video source has been processed, or until a predetermined number of frames or a predetermined duration of video source has been processed. For example, the processor may process 30 seconds of video at a time. Once the final frame of the video sequence has been processed, the processor may output the activity value at step 4130.

FIG. 5 is a flowchart illustrating a second exemplary image analysis algorithm 5000 that may be performed by the processor and/or graphics processor of a beehive monitoring system in accordance with the disclosure. The algorithm 5000 may be suitable for generating an activity value that estimates the number of bees moving about a beehive or other structure. The algorithm 5000 may be particularly well suited for calculating an activity count for a bumblebee hive, where there are typically fewer bees and/or bees moving at a lower speed, such as bees engaged in a guarding behavior.

At step 5010, the processor loads a video source. The video source may be loaded from a storage device or received directly from an image sensor in real time. At step 5020, the processor loads a video frame from the video source. At step 5030, the processor calculates an average frame by adding a previous frame to the current frame. The current frame may be scaled by a constant k that falls between 0 and 1 before being added to the previous frame. If there is no previous frame in memory, as upon initialization of the algorithm, the processor may set the average frame equal to the current frame.

At step 5040, the processor may perform a test to determine if the average frame satisfies a predefined condition. For example, the processor may check whether a normalized value representing the difference between the average frame and the current frame exceeds a threshold value T. If the difference between the current frame and the average frame is too large, the processor may proceed to step 5050, where the average frame is set equal to the current frame. The processor may then return to step 5030. If the average frame does satisfy the predefined condition, the processor may then proceed to step 5060.

At step 5060, the processor may generate a differential image frame by subtracting the average frame from the current frame. The processor may be configured to accelerate the image processing by reducing the amount of information required to represent the current frame and the average frame. For example, the processor may first perform a grayscale operation on one or both the of current frame and the average frame. Alternatively, or additionally, the processor may crop the image down to a specific area or region of interest, such as that surrounding the opening of the hive.

At step 5070, the processor generates a first modified differential image frame by performing an erosion operation on the differential image frame. The erosion operation is a convolution filter that essentially removes objects from the image whose size or area falls below a threshold. This serves to remove regions of differential movement that are too small to represent an object of interest, e.g., a bee, within the field of interest, e.g., near the opening of the hive.

At step 5080, the processor generates a second modified differential image frame by performing a dilation operation on the first modified differential image frame. The dilation operation is another convolution filter that essentially enlarges any objects remaining in the image after the erosion operation. One side effect of the erosion operation is that occasionally a single object in the image before the erosion operation will be split into two closely-spaced smaller objects after the erosion operation. This can occur, for example, if a bee and it's shadow are closely spaced. Thus, the dilation operation, by enlarging the objects in the frame after the erosion operation, serves to combine any small, closely-spaced objects back into a single object. This helps prevent a single moving object, such as a bee and it's shadow, from being counted as two moving objects. The erosion and dilation parameters used in steps 5070 and 5080 may be chosen based on the expected size of an object of interest, e.g., a bee, within the field of interest, e.g., near the opening of a beehive.

At step 5090, the processor performs blob detection on the second modified differential image frame to identify a set of contours that may be appear in the frame. The processor then outputs a count of the number of contours in the set of contours to a low-pass filter and returns to step 5020 and loads a next video frame from the video source and repeats.

As the processor executes the algorithm 5000 on each subsequent frame of the video source, the processor generates a series of contour count values that are low-pass filtered at step 5100 to generate a filtered series of contour count values. This eliminates high-frequency changes in the contour count values which may be noise or otherwise not indicative of a true change in the number of bees in the sequence of video frames. At step 5110, the processor increments the activity value each time the filtered series of count values increases. For example, if the filtered series of contour count values increases from 0 to 1, the activity value may be incremented from 0 to 1. If the filtered series of count values then increase from 1 to 3, the activity value is then incremented to 3. In an exemplary embodiment, the activity value is not decremented when the filtered series of contour count values decreases.

The processor may iterate through the algorithm 5000 until predetermined number of frames or a predetermined duration of video has been processed. For example, the processor may process a 1 minute segment of video. Once all of the frames in the video sequence have been processed, the processor outputs the activity value at step 5120.

Within either of the above described algorithms, color segmentation and feature detection techniques such as Haar-type cascades tuned for pollen detection can be used to automatically determine whether a bee identified within the frame is carrying pollen. By counting the number of bees carrying pollen into or around the hive, beekeepers can track the pollination effectiveness of individual colonies.

Figure 6A:
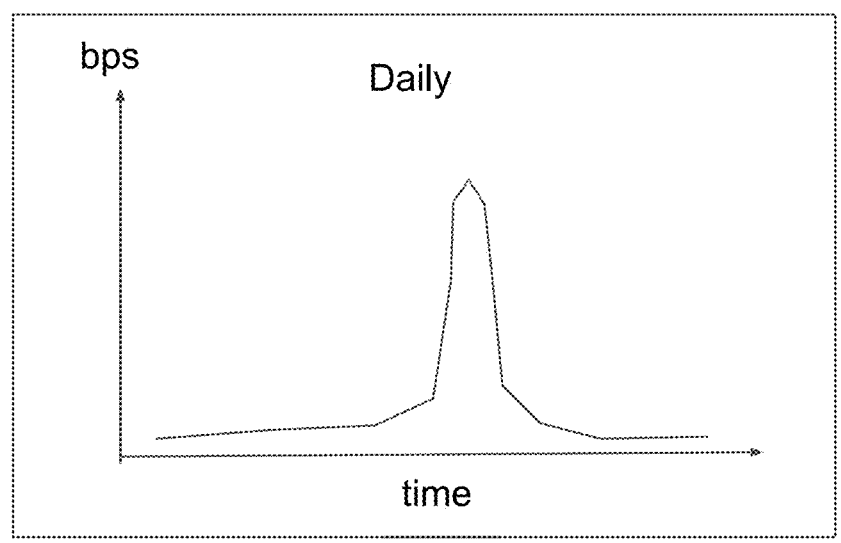
FIG. 6A shows an exemplary plot of bee activity on a daily time base that can be displayed on a user device.

FIG. 6A illustrates an example plot of the calculated activity values that can be retrieved and displayed on the user device. The plot may include a time axis and an activity value axis or other axes for environmental data such as temperature or humidity. By way of example, the output of algorithm discussed with respect to FIG. 4 may be construed as a measure of "bees per second" or "bps" flying around the beehive. Although the plot in FIG. 6A illustrates the activity value of the beehive over a period of one day, the activity values may be plotted over any time basis, including minutes, hours, days, weeks, or years. The activity values in the plot demonstrate a spike in activity after mid-day. This spike may be indicative of an orientation flight, during which younger bees leave the hive when conditions are optimal to learn their surroundings. This behavior pattern tends to be indicative of a healthy hive and typically occurs on a daily basis with a healthy hive. By automatically calculating and plotting the activity values, the disclosed bee monitoring system allows beekeepers to quickly and visually recognize whether a hive is exhibiting this behavior.

In addition, pattern recognition tools may be employed, either at the user device, the server, or the on-board processor of the camera, to automatically identify notable patterns in the series of activity values, such as the spike illustrated in FIG. 6A. This enables the system to automatically identify and classify the state of the hive, and issue notifications or alerts to the user device indicating the state of the hive. For example, the system may compare daily series of activity values against an existing database of known patterns in order to identify events of interest and generate notifications to interested parties. The database of existing patterns may include patterns indicative of swarming, robbing, orientation flights (as discussed above) and/or pesticide spraying. A swarming pattern may be characterized by narrow upward spike in hive activity that may be as much as two to three times the magnitude of the hives normal orientation spike. A robbing pattern, in which bees from another have remove honey from the hive, may be characterized by increased activity followed by a long decay. An orientation pattern may be characterized by a periodic spike in activity that occurs once every day or two around roughly the middle to later part of the day. Pesticide spraying may result in a total collapse or failure of the hive, with many dead bees apparent in front of the hive as it affects the field foragers. A pesticide spray pattern may be characterized by an activity series that falls to zero with many dead bees apparent in front of the hive as it affects the field foragers. The system may be configured to generate an alert or notification when a swarming, robbing, pest or pesticide spray pattern is observed in the daily activity value series. Similarly, the system may also be configured to generate an alert when an orientation pattern is not observed in a daily activity value series.

The pattern matching and alerting function may also be informed by associated environmental data. For example, orientation flights may not occur on a day with unusually high wind or unusually low or high temperatures. Accordingly, while the system would normally generate an alert if there was no orientation pattern observed on a given day, the system may not generate an alert if there were unusually high winds or low temperatures that day. Additionally, the system may generate daily and weekly activity reports for each hive that are transmitted to the user device or otherwise made available to the user. The reports may include statistical analysis of the daily or weekly activity series for each hive. For example, the report may include maximum, minimum, and/or average activity values over the course of the day or week for each hive.

Figure 6B:
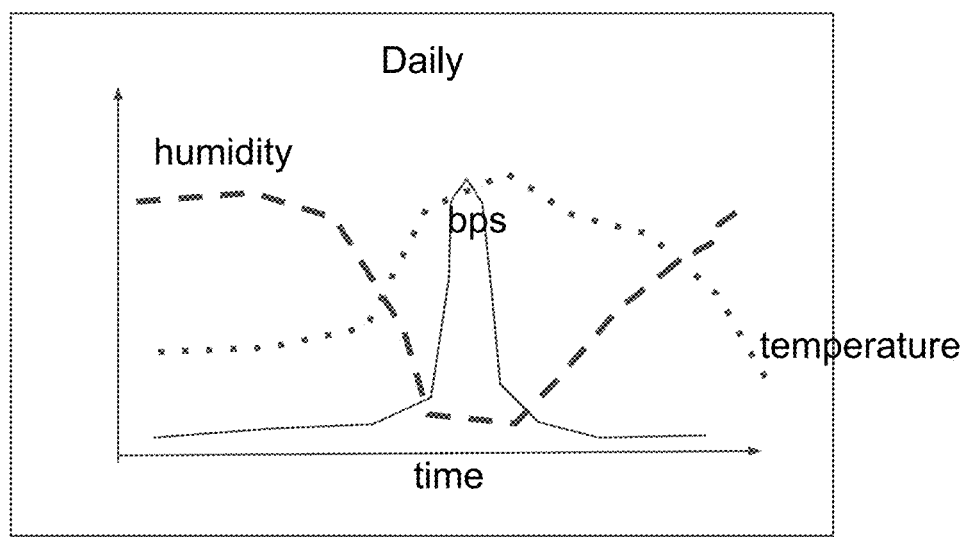
FIG. 6B shows an exemplary plot of bee activity and environmental variables that can be displayed on a user device.

FIG. 6B illustrates an example plot including activity values over a period of one day in conjunction with humidity and temperature plots. The humidity and temperature data may be acquired from environmental sensors in communication with the bee monitoring system. As noted above, the system may employ pattern recognition tools to analyze patterns in environmental data in conjunction with the calculated activity values. Over time, the system may associate patterns in environmental data with changes in activity values around the hive. This knowledge may be useful for improving beekeeping in general. In addition, by enabling the system to anticipate changes in hive activity caused by changes in environmental conditions, the system's health classification and notification system can be made more effective.

Figure 7A:
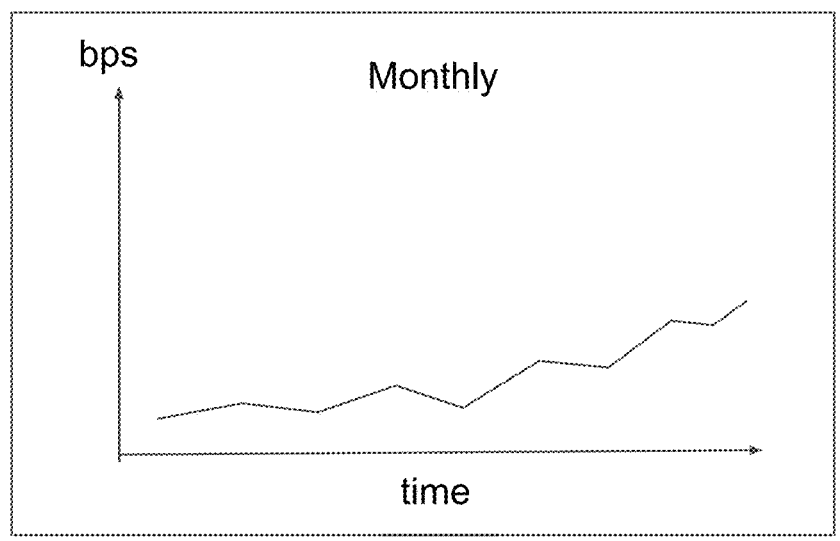
FIG. 7A shows an exemplary plot of bee activity on a monthly time base that can be displayed on a user device.

FIG. 7A illustrates an example plot of activity values on a monthly basis. The plotted values could represent average, peak, or any other statistical interpretation of the calculated activity values over the time basis. The plot in FIG. 7A demonstrates a gradual increase in hive activity over time, which may be indicative of a healthy hive. The system may automatically generate multi-day (e.g., weekly or monthly) activity reports that are transmitted to the user device or otherwise made available to the user. The reports may include statistical analysis of each hive during the analysis period. For example, the multi-day reports may include a total activity value for each hive over the analysis period. The total activity value may be computed by multiplying the average activity value for each day by the length of the day for each day in the analysis period. The total activity value and other statistical measures may be plotted over time in the multi-day activity report to show growth trends for each hive. Moreover, the growth trends for each hive may be compared against a library of multi-day activity patterns to identify unexpected trends and update the hive health status and/or generate alerts. As with the daily series pattern recognition, the multi-day pattern recognition may take into account timestamps, geolocation and environmental data.

Figure 7B:
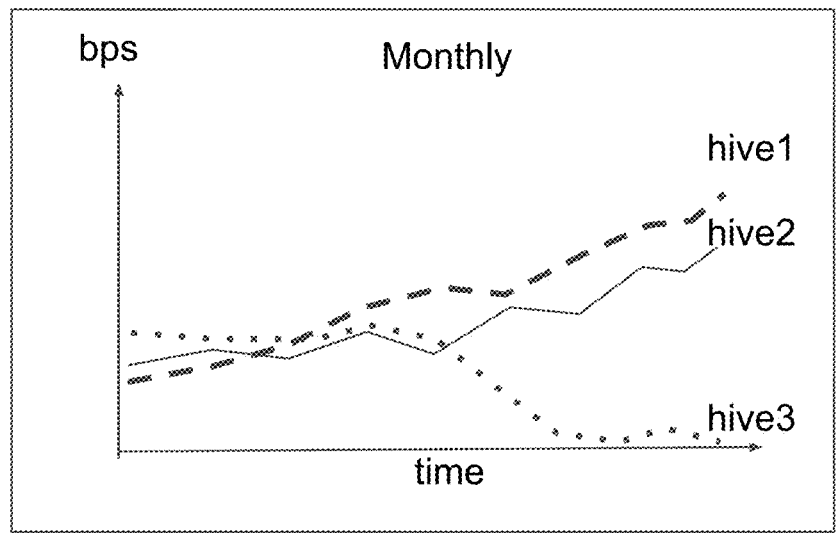
FIG. 7B shows an exemplary plot of bee activity from multiple hives on a monthly time base that can be displayed on a user device.

FIG. 7B is a plot of activity values from multiple hives over the period of a month. The system may be configured to compare hive data, including activity value series, climate zone, environmental data, and geolocation, of multiple hives over a specified analysis period. This may be useful for determining whether hives that should be performing similarly are in fact doing so. For example, the system may automatically identify and select comparable hives based on geolocation, climate zone, and/or environmental data. Alternatively, the user may select a number of hives among the available hives for comparison. The system may then compare the daily or multi-day activity series of the selected hives to determine whether the selected hives are performing similarly.

As can be seen from the plot in FIG. 7B, the activity values for Hive 1 and Hive 2 show steady growth over the period of one month, which tends to indicate that Hive 1 and Hive 2 are healthy. The activity values for Hive 3, on the other hand, demonstrate a marked decline over the same time period. This may indicate that the hive is unhealthy and requires maintenance. The system can be configured to automatically recognize the discrepancy in the growth patterns and generate an alert or update the health status of the hive accordingly.

As noted above, the system can also be configured to send notifications or alerts to the user device. These notifications and alerts may be delivered, for example, via SMS or text message, email, automated phone call or voicemail, within a web app running on the user device, or via a webpage accessible via a web browser running on the user device. The system may send an alert or notification when the activity pattern or one or more hives changes unexpectedly. For example, the system may be configured to send an alert to the user device when the calculated activity level exceeds or falls below predetermined thresholds. In addition, the system can be configured to send an alert to the user device if the calculated activity pattern deviate from past values by more than a predefined percentage.

Figure 8:
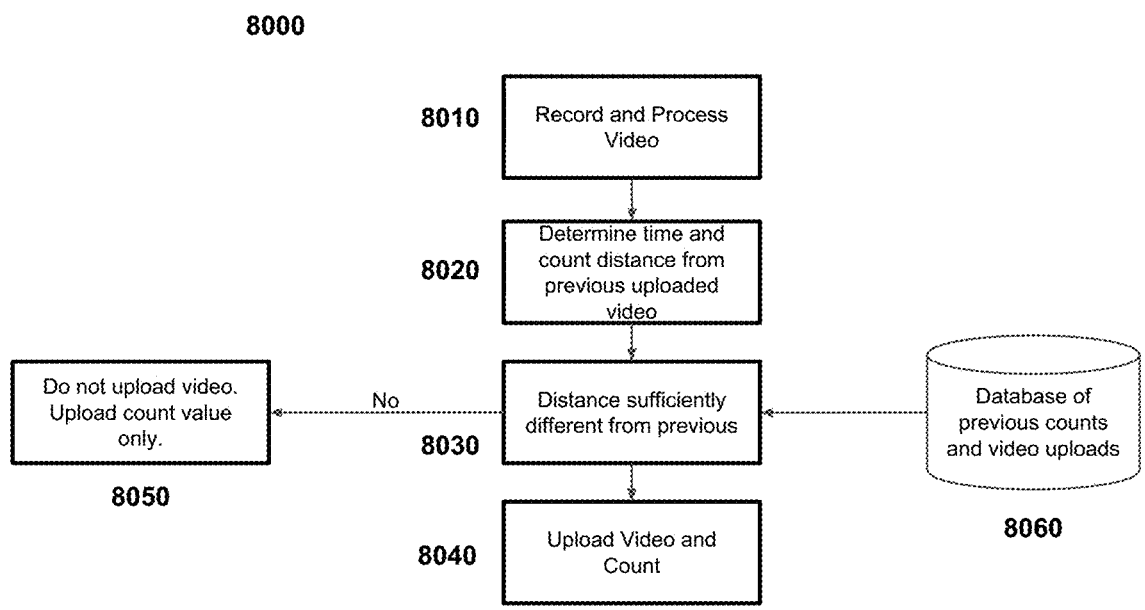
FIG. 8 is a flowchart illustrating an exemplary intelligent video upload algorithm that can be employed in a beehive monitoring system.

The video captured by the monitoring system may be segmented and organized into clips of any given length, e.g., 5 seconds, 10 seconds, 30 seconds, 1 minute, 5 minutes, 10 minutes, 30 minutes, 1 hour, etc. These clips may be stored in a database in association with their respective activity values, using time stamps or other searchable indices, on the storage device of the camera after processing by the processor. In some embodiments, to reduce energy, storage, and bandwidth consumption, not every video clip and/or associated activity value will be uploaded to the server. FIG. 8 illustrates an example video uploading algorithm 8000 used to determine when and/or which video clips should be uploaded to the server. At step 8010, video is recorded and processed as described above. At step 8020, the processor calculates a "distance" value for each video clip based on the time since the last video clip in the database 8060 was uploaded to the server and difference between the activity value of the current video clip and that of the last video clip that was uploaded to the server. If, at step 8030, the processor determines the distance value of the current video clip exceeds a threshold, the video clip and its associated activity value are uploaded to the server at step 8040. Otherwise, the processor proceeds to step 8050 and uploads only the activity value for the current video clip to the server.

Figure 9A:
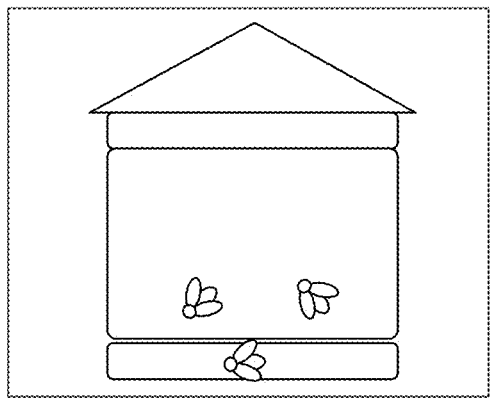
FIGS. 9A-C illustrate the operation of a visualization tool that can be used to tune a motion detection algorithm to accurately detect objects of interest within a field of interest.
Figure 9B:
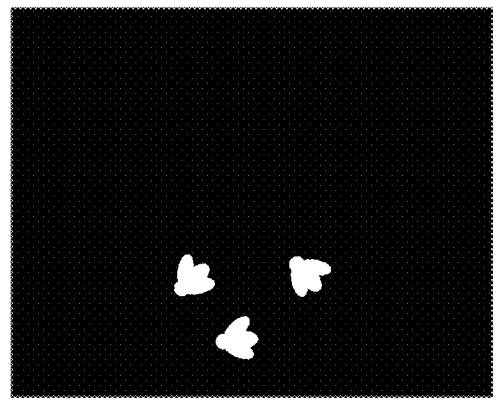
Figure 9C:
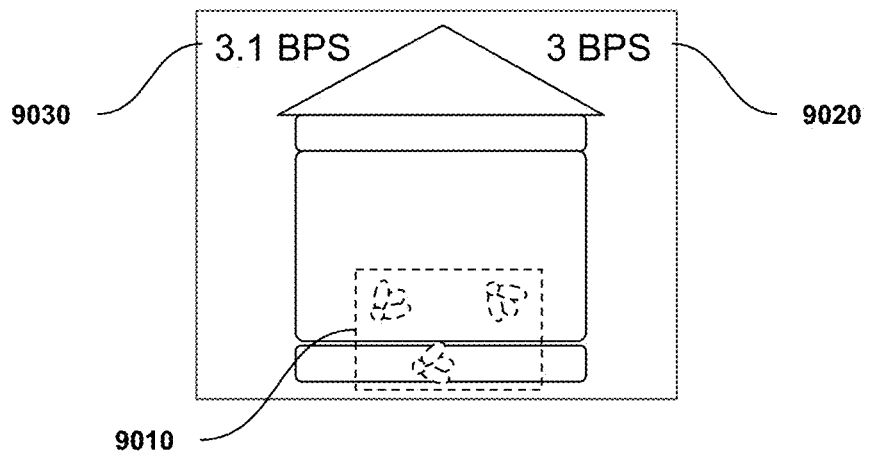

FIGS. 9A-C illustrate aspects of an exemplary visualization tool that can be used to tune the parameters of the algorithms discussed above to achieve effective motion tracking of objects of interest in the field of interest. FIG. 9A illustrates a video of a beehive captured by a camera. FIG. 9B illustrates a differential image frame generated as discussed above with thresholding and contour detection applied. FIG. 9C illustrates the output of the visualizer tool, which overlays the output of the contour detection 9010 from FIG. 9B onto the unprocessed video depicted in FIG. 9A. The visualizer tool also displays an instantaneous activity value 9020 output from the processor as well as a running average of the instantaneous activity value 9030 over the duration of the video clip. By providing visual feedback of the motion tracking algorithm in conjunction with the calculated activity values, the user is able to see whether the algorithm is accurately tracking the objects of interest in the field of interest and adjust the parameters of the algorithm accordingly.

Although the embodiments discussed above have been directed to monitoring a beehive, it is to be appreciated that the disclosed system can be used to obtain a visual summary of activity levels in any environment. For example, the system could be used to measure, track, and/or classify activity levels of other dynamic objects over time, including insects or other animals, plants, people, machines, and/or structures.

Aspects of disclosure may be a embodied as a system, a method, and/or a computer program product. The computer program product may include a computer readable storage medium (or media) having computer readable program instructions thereon for causing a processor to carry out aspects of the disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations described in this disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the disclosure.

Aspects of the disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While certain exemplary embodiments have been described and shown in the accompanying drawings, it is to be understood that such embodiments are merely illustrative of and not restrictive on the broader aspects of the disclosure, and that this disclosure not be limited to the specific constructions and arrangements shown and described, since various other modifications may occur to those ordinarily skilled in the art.

What is claimed is:

1. A system for monitoring the pollination effectiveness of a bee colony, the system comprising:
    a camera that captures a sequence of video frames of one or more bees;
    a processor in communication with the camera, the processor configured to perform image analysis on the sequence of video frames, wherein the image analysis includes:
        calculating an activity value relating to the one or more bees, wherein calculating the activity value includes counting a number of the one or more bees carrying pollen using one or more of color segmentation and Haar-type cascade feature detection techniques tuned for pollen detection; and
        storing the activity value for display on a user interface.

2. A method for monitoring the pollination effectiveness of a bee colony, the method comprising:
- capturing, using a camera, a sequence of video frames of one or more bees;
- analyzing, by a processor in communication with the camera, the sequence of video frames, wherein analyzing includes:
  - calculating an activity value relating to the one or more bees, wherein calculating the activity value includes counting a number of the one or more bees carrying pollen using one or more of color segmentation and Haar-type cascade feature detection techniques tuned for pollen detection; and
  - storing the activity value for display on a user interface.

3. A computer-readable medium of instructions that, when executed, cause a processor to perform a method, the method comprising:
- capturing, using a camera, a sequence of video frames of one or more bees;
- analyzing, by a processor in communication with the camera, the sequence of video frames, wherein analyzing includes:
  - calculating an activity value relating to the one or more bees, wherein calculating the activity value includes counting a number of the one or more bees carrying pollen using one or more of color segmentation and Haar-type cascade feature detection techniques tuned for pollen detection; and
  - storing the activity value for display on a user interface.

* * * * *